US012809406B2

(12) United States Patent
Kumaki et al.

(10) Patent No.: US 12,809,406 B2
(45) Date of Patent: Nov. 24, 2026

(54) PRESSURE REDUCTION VALVE

(71) Applicants: AISAN KOGYO KABUSHIKI KAISHA, Obu (JP); TOYOTA JIDOSHA KABUSHIKI KAISHA, Toyota (JP)

(72) Inventors: Junichi Kumaki, Tokai (JP); Takahiro Makihara, Obu (JP); Yutaka Hotta, Toyota (JP)

(73) Assignees: AISAN KOGYO KABUSHIKI KAISHA, Aichi (JP); TOYOTA JIDOSHA KABUSHIKI KAISHA, Aichi (JP)

( * ) Notice: Subject to any disclaimer, the term of this patent is extended or adjusted under 35 U.S.C. 154(b) by 127 days.

(21) Appl. No.: 18/869,702

(22) PCT Filed: May 12, 2023

(86) PCT No.: PCT/JP2023/017937
§ 371 (c)(1),
(2) Date: Nov. 26, 2024

(87) PCT Pub. No.: WO2023/238601
PCT Pub. Date: Dec. 14, 2023

(65) Prior Publication Data

US 2026/0244227 A1 Aug. 20, 2026

(30) Foreign Application Priority Data

Jun. 10, 2022 (JP) ................................ 2022-094365

(51) Int. Cl.

| | |
|---|---|
| ***G05D 16/10*** | (2006.01) |
| ***F02M 37/00*** | (2006.01) |
| ***F16K 15/02*** | (2006.01) |

(52) U.S. Cl.
CPC ....... *G05D 16/103* (2013.01); *F02M 37/0029* (2013.01); *F16K 15/026* (2013.01); *Y10T 137/7826* (2015.04)

(58) Field of Classification Search
CPC ............ G05D 16/107; Y10T 137/7826; F02M 37/0029; F16K 15/026
See application file for complete search history.

(56) References Cited

U.S. PATENT DOCUMENTS 3,064,670 A * 11/1962 Peras .................. G05D 16/107 137/505.34
6,155,290 A * 12/2000 Nakajima .......... G05D 16/0402 137/505.41

(Continued)

FOREIGN PATENT DOCUMENTS

JP 2014-115820 A 6/2014
JP 2016-142380 A 8/2016

(Continued)

OTHER PUBLICATIONS

Office Action from German Patent Office dated Apr. 11, 2025 (9 pages).

(Continued)

*Primary Examiner* — Kevin F Murphy
(74) *Attorney, Agent, or Firm* — Jason A. Smith; Shumaker, Loop & Kendrick, LLP

(57) ABSTRACT

An outer surface of the inner tubular portion in the middle portion may be recessed inward in a radial direction of the inner tubular portion over an entire periphery of the inner tubular portion. A distance between the outer surface of the inner tubular portion in the middle portion and a inner surface of the outer tubular portion may be greater than a distance between the outer surface of the inner tubular portion in the first end portion and the inner surface of the outer tubular portion and greater than a distance between the (Continued)

outer surface of the inner tubular portion in the second end portion and the inner surface of he outer tubular portion.

1 Claim, 8 Drawing Sheets

(56) References Cited

U.S. PATENT DOCUMENTS

| | | | | |
|---|---|---|---|---|
| 6,176,256 | B1 * | 1/2001 | Nakajima | G05D 16/0402 137/505.11 |
| 8,028,716 | B2 * | 10/2011 | Suzuki | F16K 31/122 251/63.5 |
| 9,464,731 | B2 | 10/2016 | Haneda et al. | |
| 10,534,379 | B2 * | 1/2020 | Sugiyama | G05D 16/0661 |
| 10,584,799 | B2 * | 3/2020 | Kubo | F16K 17/065 |
| 11,703,893 | B2 * | 7/2023 | Sellen | G05D 16/107 137/495 |

FOREIGN PATENT DOCUMENTS

| | | | |
|---|---|---|---|
| JP | WO2016/125512 | A1 | 8/2016 |
| JP | 2019-132347 | A | 8/2019 |
| JP | 2022-73711 | A | 5/2020 |
| JP | 2021-076154 | A | 5/2021 |

OTHER PUBLICATIONS

International Search Report (ISR) for PCT/JP2023/017937 mailed Jul. 18, 2023 (5 pages including English translation).

Written Opinion (WO) for PCT/JP2023/017937 mailed Jul. 18, 2023 (5 pages).

* cited by examiner

PRESSURE REDUCTION VALVE

TECHNICAL FIELD

Teachings disclosed in this description relate to a pressure reduction valve.

BACKGROUND ART

Patent Document 1 describes a pressure reduction valve that regulates gas pressure. The pressure reduction valve of Patent Document 1 includes an outer member and an inner member disposed inside the outer member. The outer member includes a valve seat portion having an opening which allows a gas to flow therethrough, and an outer tubular portion extending tubularly from the valve seat portion. The inner member includes a valve body portion which opens and closes the opening of the valve seat portion, and an inner tubular portion extending tubularly from the valve body portion and disposed inside the outer tubular portion.

CITATION LIST

Japanese Patent Application Publication No. 2014-115820

SUMMARY OF INVENTION

Technical Problem

The pressure reduction valve of Patent Document 1 regulates a gas pressure, however, if a pressure reduction valve of this type is used to regulate a liquid pressure, liquid would remain between the inner surface of the outer tubular portion and the outer surface of the inner tubular portion due to surface tension effect. For example, in cold climates, the liquid remaining therein could lead to a malfunction of the pressure reduction valve when the liquid freezes. Further, the remaining liquid expands its volume by being frozen, which could tilt the inner member inside the outer member. Even in a pressure reduction valve regulating a gas pressure, liquid contained in a gas may enter between the inner surface of the outer tubular portion and the outer surface of the inner tubular portion and remain therein. In this case as well, when the remaining liquid freezes, it may cause malfunction of the pressure reduction valve or tilt of the inner member.

The present description provides a technology that stabilizes the posture of an inner member, while suppressing a liquid from remaining between an inner surface of an outer member and an outer surface of an inner member.

Solution to Technical Problem

A pressure reduction valve disclosed in the present description comprises an outer member and an inner member disposed inside the outer member. The outer member may comprise a valve seat portion having an opening which allows a fluid to flow therethrough and an outer portion extending tubularly from the valve seat portion. The inner member may comprise a valve body portion which opens and closes the opening and an inner tubular portion extending tubularly from the valve body portion and disposed inside the outer tubular portion. The inner tubular portion may comprise a first end portion located at a valve body-side end, a second end portion located at an end opposite to the valve body portion, and a middle portion located between the first end portion and the second end portion. An outer surface of the inner tubular portion in the middle portion may be recessed inward in a radial direction of the inner tubular portion over an entire periphery of the inner tubular portion. A distance between the outer surface of the inner tubular portion in the middle portion and an inner surface of the outer tubular portion may be greater than a distance between the outer surface of the inner tubular portion in the first end portion and the inner surface of the outer tubular portion and greater than a distance between the outer surface of the inner tubular portion in the second end portion and the inner surface of the outer tubular portion.

According to this configuration, the outer surface of the inner tubular portion in the middle portion is recessed, and this suppresses the liquid (e.g., a liquid fuel, water contained in a gas fuel, or the like) from remaining between the inner surface of the outer tubular portion and the outer surface of the inner tubular portion in the middle portion. Further, although the distance between the outer surface of the inner tubular portion in the middle portion and the inner surface of the outer tubular portion is large, the posture of the inner tubular portion within the outer tubular portion can be stabilized by the presence of the first and second end portions of the inner tubular portion. Thus, the configuration above can stabilize the posture of the inner member while suppressing the liquid from remaining between the inner surface of the outer member and the outer surface of the inner member.

The distance between the outer surface of the inner tubular portion in the first end portion and the inner surface of the outer tubular portion may be greater than the distance between the outer surface of the inner tubular portion in the second end portion and the inner surface of the outer tubular portion.

This configuration can suppress the liquid from remaining between the inner surface of the outer tubular portion and the outer surface of the inner tubular portion in the middle portion.

DESCRIPTION OF EMBODIMENT

Figure 1:
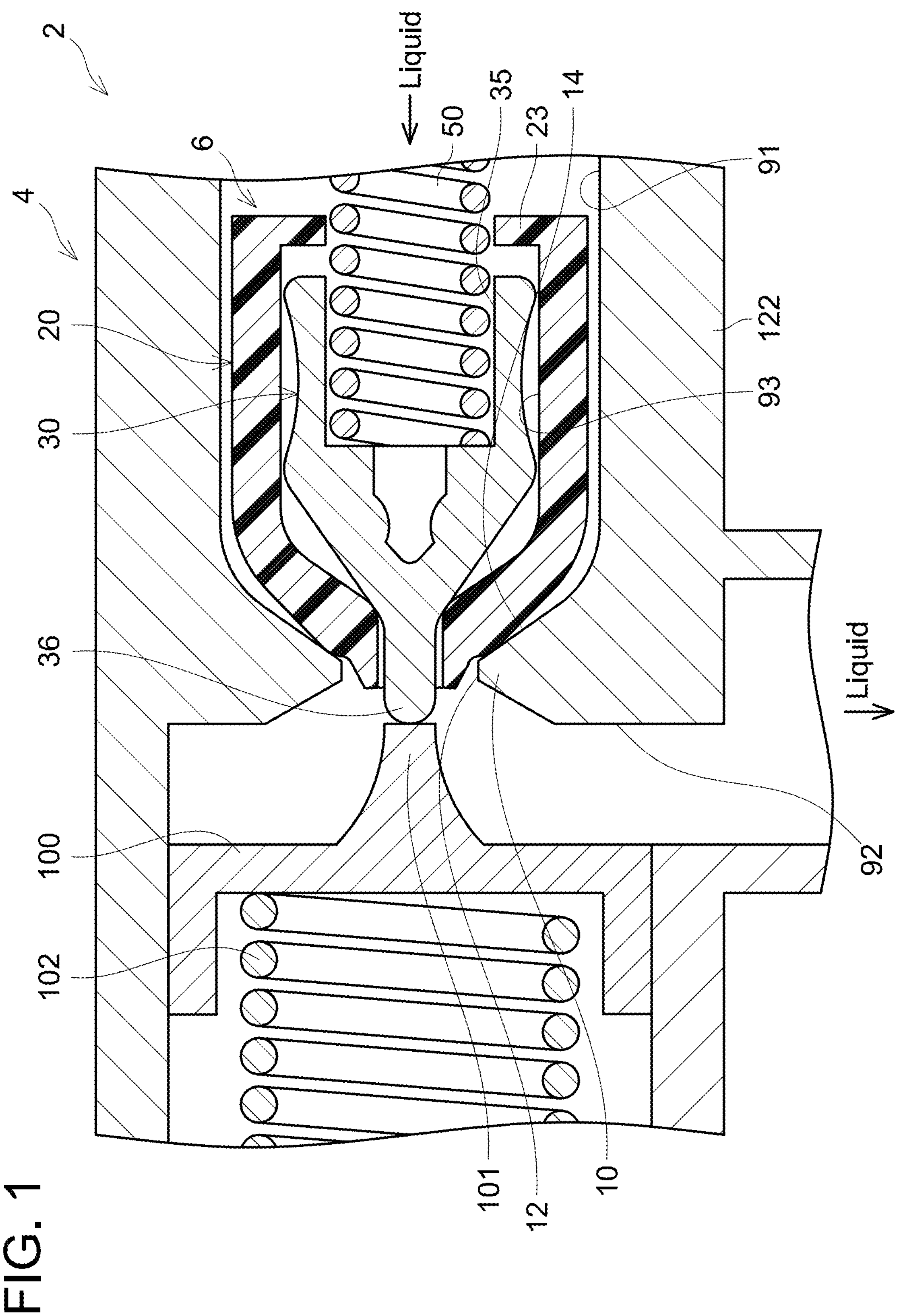
FIG. 1 is a cross-sectional view of a pressure reduction valve according to an embodiment.

A pressure reduction valve 2 according to an embodiment is described with reference to the drawings. The pressure reduction valve 2 according to the embodiment is a valve for reducing a pressure of a fluid (e.g., a liquid such as water, a liquid fuel, etc., or a gas such as hydrogen gas, etc.). Hereinafter, the pressure reduction valve 2 for reducing the pressure of a liquid will be described. As shown in FIG. 1, the pressure reduction valve 2 according to the embodiment comprises a body 4 and a valve body 6.

The body 4 comprises a first flow path 91, a second flow path 92, a first valve seat portion 10, and a body tubular portion 122. The first flow path 91 and the second flow path 92 are configured to allow the liquid such as water, a fuel, etc. to flow therethrough. The first valve seat portion 10 is located between the first flow path 91 and the second flow path 92. The body tubular portion 122 tubularly extends from the first valve seat portion 10. The first valve seat portion 10 and the body tubular portion 122 are integrally formed.

In a flowing direction of the liquid, the first flow path 91 is located upstream of the first valve seat portion 10. The first flow path 91 is connected to a supply source of the liquid (e.g., a fuel pump (not shown)). The liquid is supplied from the supply source of the liquid to the first flow path 91. In the flowing direction of the liquid, the second flow path 92 is located downstream of the first flow path 91 and the first valve seat portion 10. The second flow path 92 is connected to a supply destination of the liquid (e.g., an engine (not shown)). The liquid is supplied to the supply destination through the second flow path 92.

The first valve seat portion 10 has a first opening 12 that allows the liquid to flow therethrough. The first opening 12 is defined in a center portion of the first valve seat portion 10. The upstream first flow path 91 communicates with the downstream second flow path 92 through the first opening 12. Further, the first valve seat portion 10 comprises a first seat surface 14. The first seat surface 14 is located around the first opening 12. The first seat surface 14 is located on the surface of the first valve seat portion 10 directed toward the first flow path 91. The first seat surface 14 faces the first flow path 91.

Next, the valve body 6 is described. The valve body 6 is located in the first flow path 91. The valve body 6 is arranged to face the first opening 12 and the first seat surface 14 of the first valve seat portion 10. The valve body 6 opens and closes the first opening 12 by separating from and contacting the first seat surface 14. When the first opening 12 is opened, the liquid flows from the first flow path 91 into the second flow path 92 through the first opening 12.

Figure 2:
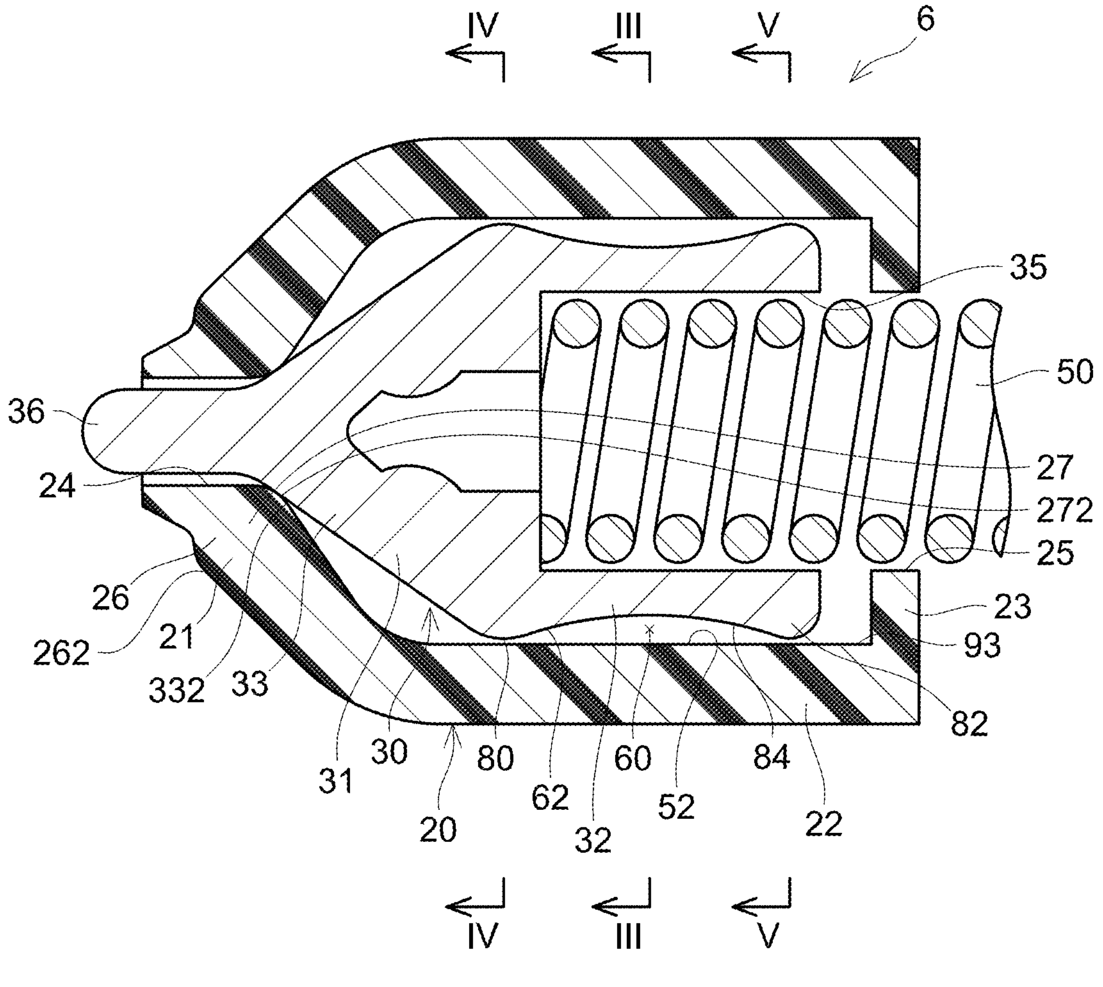
FIG. 2 is a cross-sectional view of a valve body according to the embodiment.

As shown in FIGS. 1 and 2, the valve body 6 comprises an outer valve body 20 (an example of outer member) and an inner valve body 30 (an example of inner member). For example, the outer valve body 20 is constituted of a resin (a silicon rubber, a synthetic rubber, or the like). The outer valve body 20 is arranged to face the first opening 12 and the first seat surface 14 of the first valve seat portion 10. The outer valve body 20 contacts and separates from the first seat surface 14.

The outer valve body 20 comprises a first tip end portion 21, a first tubular portion 22 (an example of outer tubular portion), a first base end portion 23, and a third flow path 93. The first tip end portion 21, the first tubular portion 22, and the first base end portion 23 are integrally formed. The first tip end portion 21 faces the first valve seat portion 10. The third flow path 93 is defined in the first tip end portion 21, the first tubular portion 22, and the first base end portion 23.

The first tip end portion 21 is formed in a substantially conical shape. In a variant, the first tip end portion 21 may be formed in a substantially elliptic cone shape or as a substantially polygonal pyramid. The inner and outer diameters of the first tip end portion 21 decrease toward the tip. The first tip end portion 21 has a second opening 24 that allows the liquid to flow therethrough. The second opening 24 is defined in a radially center portion of the first tip end portion 21. The upstream third flow path 93 communicates with the downstream second flow path 92 through the first opening 12 of the first valve seat portion 10 and the second opening 24 of the outer valve body 20.

Further, the first tip end portion 21 comprises a first valve body portion 26 and a second valve seat portion 27. The first valve body portion 26 is located on the outer circumference of the first tip end portion 21 (a portion thereof facing the first valve seat portion 10). The second valve seat portion 27 is located on the inner circumference of the first tip end portion 21 (a portion thereof facing the third flow path 93). The second opening 24 is defined in the second valve seat portion 27.

The first valve body portion 26 faces the first seat surface 14 of the first valve seat portion 10 of the body 4. The first valve body portion 26 comprises a first contact surface 262 that contacts and separates from the first seat surface 14. The first contact surface 262 is located on the outer surface of the first tip end portion 21 and faces the first seat surface 14. The first contact surface 262 is located around the second opening 24.

The second valve seat portion 27 comprises a second seat surface 272. The second seat surface 272 is located around the second opening 24. The second seat surface 272 is located on the inner surface of the first tip end portion 21 and faces the third flow path 93.

The first tubular portion 22 is described. The first tubular portion 22 tubularly extends from the first valve body portion 26 and the second valve seat portion 27. The first tubular portion 22 is formed in a substantially cylindrical shape. In a variant, the first tubular portion 22 may be formed in a substantially elliptic tubular shape or a substantially polygonal tubular shape. In the cross-sectional views shown in FIGS. 3 to 5, an inner surface 52 of the first tubular portion 22 is formed in a substantially circular shape. In a variant, the inner surface 52 of the first tubular portion 22 may be formed in a substantially elliptic shape or a substantially polygonal shape. As shown in FIGS. 1 and 2, the first tubular portion 22 tubularly extends rearward (upstream) from a rear end of the first tip end portion 21 (end thereof opposite to the first valve seat portion 10). The first tubular portion 22 is located between the first tip end portion 21 and the first base end portion 23.

The first base end portion 23 is formed in a substantially annular shape. In a variant, the first base end portion 23 may be formed in a substantially elliptic annular shape or a substantially polygonal annular shape. The first base end portion 23 extends inward in the radial direction of the first tubular portion 22 from a rear end of the first tubular portion 22 (end thereof opposite to the first tip end portion 21). The first base end portion 23 has a third opening 25 that allows the liquid to flow therethrough. The third opening 25 is defined in a radially center portion of the first base end portion 23. The first flow path 91 communicates with the third flow path 93 through the third opening 25.

Next, the inner valve body 30 is described. For example, the inner valve body 30 is constituted of a metal (an alloy or the like). The inner valve body 30 is located in the third flow path 93 within the outer valve body 20. The inner valve body 30 is arranged to face the second opening 24 and the second valve seat portion 27 of the outer valve body 20. The inner valve body 30 opens and closes the second opening 24 by separating from and contacting the second valve seat portion 27. When the second opening 24 is opened, the liquid flows from the third flow path 93 into the second flow path 92 through the second opening 24 and the first opening 12 of the first valve seat portion 10.

The inner valve body 30 comprises a second tip end portion 31, a projection 36, a second tubular portion 32 (an example of inner tubular portion), and a spring chamber 35. The second tip end portion 31, the projection 36, and the second tubular portion 32 are integrally formed. The spring chamber 35 is located within the second tubular portion 32.

The second tip end portion 31 is formed in a substantially conical shape. In a variant, the second tip end portion 31 may be formed in a substantially elliptic cone shape or a substantially polygonal pyramid. The outer diameter of the second tip end portion 31 decreases toward the tip.

The second tip end portion 31 comprises a second valve body portion 33. The second valve body portion 33 is located on the outer circumference of the second tip end portion 31 (a portion thereof facing the second valve seat portion 27). The second valve body portion 33 faces the second opening 24 and the second valve seat portion 27 of the outer valve body 20. The second valve body portion 33 opens and closes the second opening 24 by separating from and contacting the second valve seat portion 27.

The second valve body portion 33 comprises a second contact surface 332 that contacts and separates from the second seat surface 272 of the second valve seat portion 27. The second contact surface 332 is located on the outer surface of the second tip end portion 31 and faces the second seat surface 272 of the outer valve body 20.

The projection 36 extends from the second tip end portion 31 toward the second opening 24 of the outer valve body 20. The projection 36 is inserted in the second opening 24 and extends toward the second flow path 92. The projection 36 projects from the second opening 24 toward the second flow path 92. The projection 36 is inserted in the first opening 12 of the first valve seat portion 10.

Next, the second tubular portion 32 is described. The second tubular portion 32 tubularly extends from the second valve body portion 33. The second tubular portion 32 is formed in a substantially cylindrical shape. In a variant, the second tubular portion 32 may be formed in a substantially elliptic tubular shape or a substantially polygonal tubular shape. In the cross-sectional views shown in FIGS. 3 to 5, an outer surface 62 of the second tubular portion 32 is formed in a substantially circular shape. In a variant, the outer surface 62 of the second tubular portion 32 may be formed in a substantially elliptic shape or a substantially polygonal shape. As shown in FIGS. 1, 2, and 6, the second tubular portion 32 tubularly extends rearward (upstream) from a rear end of the second tip end portion 31 (end thereof opposite to the projection 36). The second tubular portion 32 is located inside the first tubular portion 22 of the outer valve body 20.

The second tubular portion 32 comprises a first end portion 80, a second end portion 82, and a middle portion 84. The first end portion 80 is located at a second tip end portion 31-side end (second valve body 33-side end) of the second tubular portion 32. The second end portion 82 is located at an end of the second tubular portion 32 opposite to the second tip end portion 31 (opposite to the second valve body 33). The middle portion 84 is located between the first end portion 80 and the second end portion 82 of the second tubular portion 32.

The outer surface 62 of the second tubular portion 32 in the middle portion 84 is recessed inward in the radial direction of the second tubular portion 32 over the entire periphery of the second tubular portion 32. The outer surface 62 of the second tubular portion 32 in the middle portion 84 is curved in a concave manner. The curve of the outer surface 62 in the middle portion 84 extends from the first end portion 80 to the second end portion 82.

The outer diameter of the second tubular portion 32 varies along the axial direction of the second tubular portion 32. The outer diameter of the second tubular portion 32 in the first end portion 80 and the second end portion 82 is the largest of the axially varying outer diameters of the second tubular portion 32. The outer diameter of the second tubular portion 32 in the middle portion 84 is smaller than the outer diameter of the second tubular portion 32 in the first end portion 80 and the second end portion 82.

Figure 3:
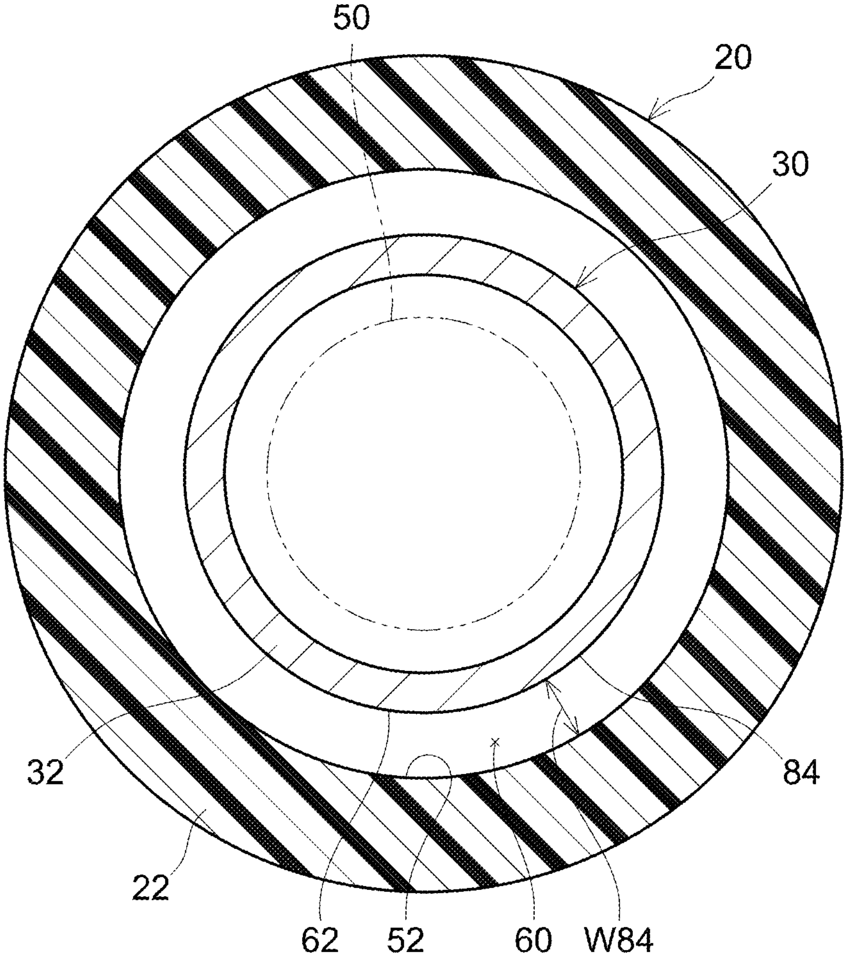
FIG. 3 is a cross-sectional view taken along III-III in FIG. 2.
Figure 4:
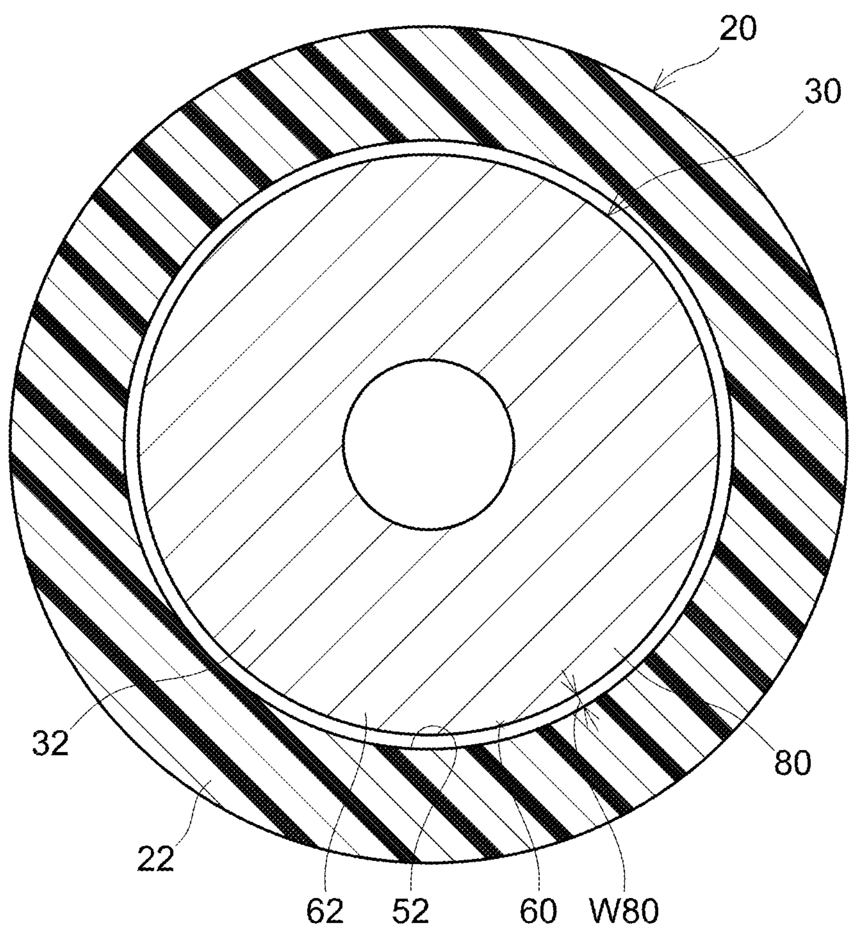
FIG. 4 is a cross-sectional view taken along IV-IV in FIG. 2.
Figure 5:
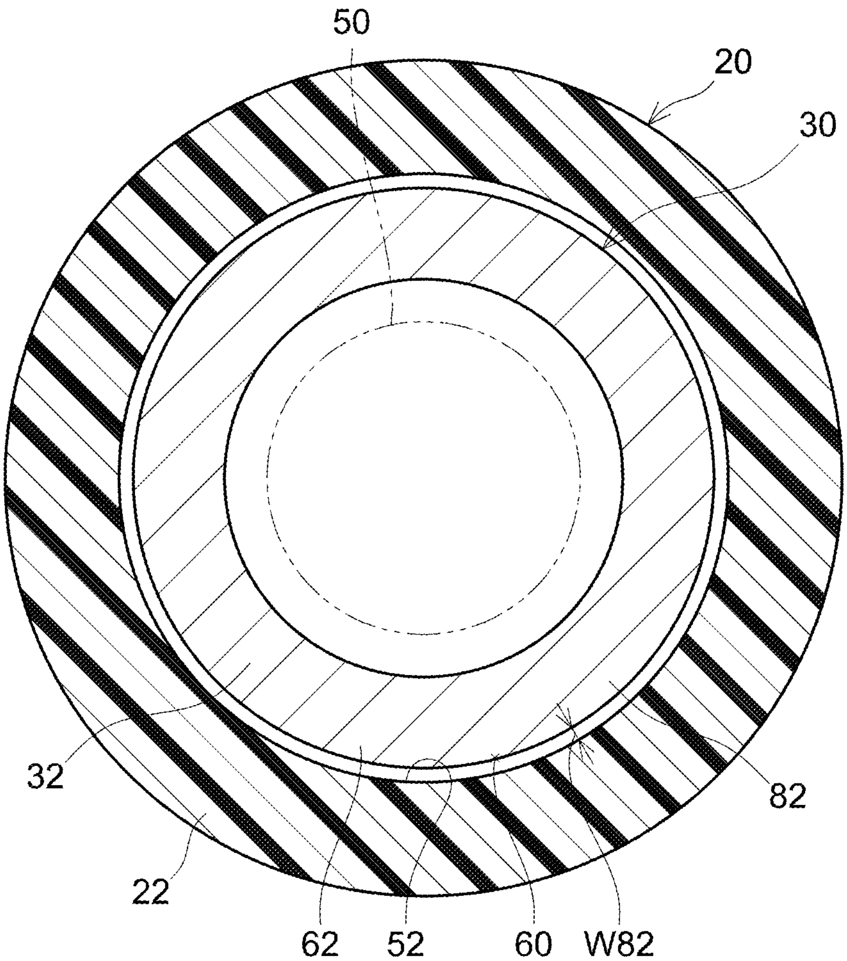
FIG. 5 is a cross-sectional view taken along V-V in FIG. 2.
Figure 6:
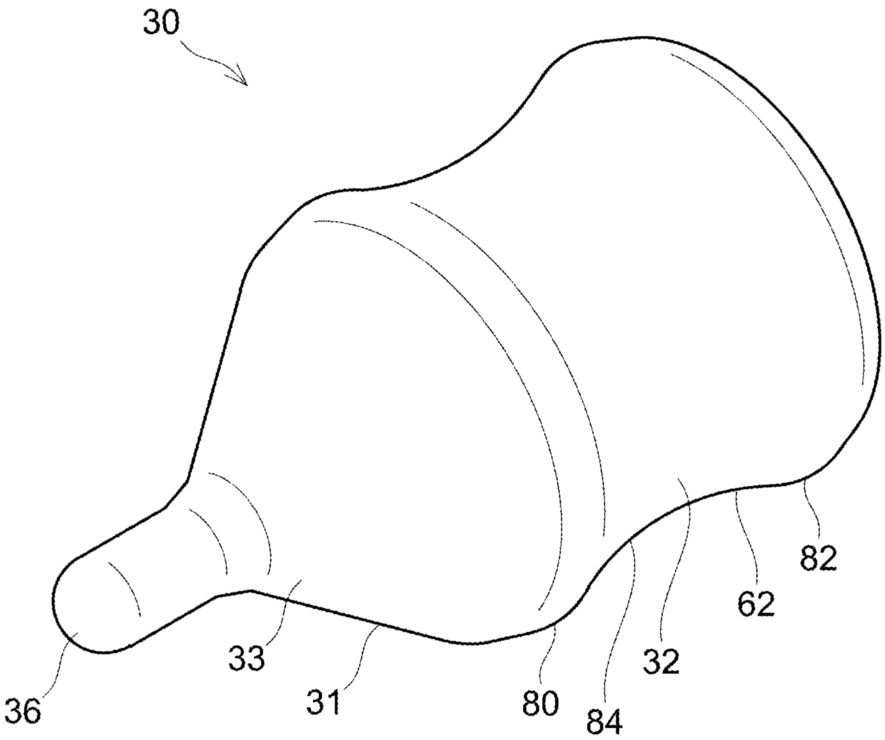
FIG. 6 is a perspective view of an inner valve body according to the embodiment.

As shown in FIGS. 3 to 5, the outer surface 62 of the second tubular portion 32 of the inner valve body 30 faces the inner surface 52 of the first tubular portion 22 of the outer valve body 20 in the radial direction of the second tubular portion 32. A clearance 60 is defined between the outer surface 62 of the second tubular portion 32 and the inner surface 52 of the first tubular portion 22, and the clearance 60 allows the liquid to flow therethrough. When the liquid flows through the third flow path 93 in the outer valve body 20, the liquid flows through the clearance 60.

The distance between the outer surface 62 of the second tubular portion 32 and the inner surface 52 of the first tubular portion 22 varies along the axial direction of the second tubular portion 32. A distance W84 between the outer surface 62 of the second tubular portion 32 in the middle portion 84 and the inner surface 52 of the first tubular portion 22 is greater than a distance W80 between the outer surface 62 of the second tubular portion 32 in the first end portion 80 and the inner surface 52 of the first tubular portion 22 (see FIGS. 3 and 4). Further, the distance W84 between the outer surface 62 of the second tubular portion 32 in the middle portion 84 and the inner surface 52 of the first tubular portion 22 is greater than a distance W82 between the outer surface 62 of the second tubular portion 32 in the second end portion 82 and the inner surface 52 of the first tubular portion 22 (see FIGS. 3 and 5). The distance W80 in the first end portion 80 and the distance W82 in the second end portion 82 are the smallest of the axially varying distance between the outer surface 62 of the second tubular portion 32 and the inner surface 52 of the first tubular portion 22. In the embodiment, the distance W80 in the first end portion 80 is the same as the distance W82 in the second end portion 82.

As shown in FIG. 1, a small coil spring 50 is disposed in the spring chamber 35 of the inner valve body 30. The small coil spring 50 is expandable along the axial direction of the valve body 6. The small coil spring 50 presses the valve body 6 (the inner valve body 30 and the outer valve body 20) in the downstream direction.

The pressure reduction valve 2 further comprises a piston 100 and a large coil spring 102. The piston 100 is configured to be movable in the left-right direction in FIG. 1. The piston 100 is pressed by the large coil spring 102 toward the valve body 6. The piston 100 comprises a projection 101 projecting toward the projection 36 of the inner valve body 30.

Next, how the pressure reduction valve 2 operates is described. Initially, the pressure reduction valve 2 is in a valve closed state. In other words, the valve body 6 is in contact with the first valve seat portion 10 of the body 4, and thus the first opening 12 is closed. Further, the inner valve body 30 is in contact with the outer valve body 20, and thus the second opening 24 is closed. When the pressure reduction valve 2 is in the valve closed state, the pressure of the liquid in the second flow path 92 is maintained at a relatively high level.

(Opening Operation) In the pressure reduction valve 2, the pressure of the liquid in the second flow path 92 is reduced by the liquid being supplied to the supply destination of the liquid. Upon the supply, the piston 100, which receives the pressure of the liquid in the second flow path 92, is pushed by the large coil spring 102 toward the valve body 6 and thus moved toward the valve body 6. In response to a large reduction in the pressure of the liquid in the second flow path 92, the piston 100 is moved a large distance toward the valve body 6. In contrast, in response to a small reduction in the pressure of the liquid in the second flow path 92, the piston 100 is moved a small distance toward the valve body 6 accordingly.

As the piston 100 is moved toward the valve body 6, the projection 101 of the piston 100 comes into contact with the projection 36 of the inner valve body 30 and pushes the inner valve body 30 in the upstream direction. The inner valve body 30 is thus moved in the upstream direction. When the piston 100 is moved a large distance toward the valve body 6, the inner valve body 30 is moved a large distance in the upstream direction. By contrast, when the piston 100 is moved a small distance toward the valve body 6, the inner valve body 30 is moved a small distance in the upstream direction accordingly.

As the inner valve body 30 is moved in the upstream direction, the second valve body portion 33 of the inner valve body 30 separates from the second valve seat portion 27 of the outer valve body 20, and the second opening 24 is thus opened. When the second opening 24 is opened, the liquid flows from the third flow path 93 in the outer valve body 20 into the second flow path 92 through the second opening 24. This state is a first valve open state. The first valve open state is established when the difference between the pressure of the liquid in the second flow path 92 and the pressure of the liquid in the first flow path 91 is relatively large. In the first valve open state, the outer valve body 20 is pushed in the downstream direction by the pressure of the liquid flowing through the third flow path 93. Thus, the outer valve body 20 is in contact with the first valve seat portion 10 of the body 4.

As the inner valve body 30 is further moved in the upstream direction in the first valve open state, the second tubular portion 32 of the inner valve body 30 comes into contact with the first base end portion 23 of the outer valve body 20 and presses the first base end portion 23 in the upstream direction. Thus, the outer valve body 20 is moved in the upstream direction. As the outer valve body 20 is moved in the upstream direction, the first valve body portion 26 of the outer valve body 20 separates from the first seat surface 14 of the first valve seat portion 10 and the first opening 12 is opened. When the first opening 12 is opened, the liquid flows from the first flow path 91 into the second flow path 92 through the first opening 12. This state is a second valve open state. The second valve open state is established when the difference between the pressure of the liquid in the second flow path 92 and the pressure of the liquid in the first flow path 91 is relatively small.

(Closing Operation) Next, a closing operation is described. The closing operation is opposite to the opening operation described above. In the pressure reduction valve 2 described above, the pressure of the liquid in the second flow path 92 is increased when the liquid flows into the second flow path 92. Thereupon, the piston 100 is pushed by the pressure of the liquid in the second flow path 92 to separate away from the valve body 6 and thus moved away from the valve body 6 (i.e., in the downstream direction). As the piston 100 is moved in the downstream direction, the inner valve body 30 is accordingly moved in the downstream direction.

As the inner valve body 30 is moved in the downstream direction, the second valve body portion 33 of the inner valve body 30 comes into contact with the second valve seat portion 27 of the outer valve body 20 and the second opening 24 is closed. As the inner valve body 30 is further moved in the downstream direction, the outer valve body 20 is pushed by the inner valve body 30 in the downstream direction, and the inner valve body 30 and the outer valve body 20 are moved in the downstream direction. As the inner valve body 30 and the outer valve body 20 are moved in the downstream direction, the first valve body portion 26 of the outer valve body 20 comes into contact with the first valve seat portion 10 of the body 4 and the first opening 12 is closed.

(Effects) The pressure reduction valve 2 according to the embodiment has been described above. As clear from the above description, in the pressure reduction valve 2 according to the embodiment, the inner valve body 30 comprises the second valve body portion 33 that opens and closes the second opening 24 of the outer valve body 20, and the second tubular portion 32 that extends tubularly from the second valve body portion 33 and is disposed inside the first tubular portion 22 of the outer valve body 20. The second tubular portion 32 comprises the first end portion 80 located at the second valve body portion 33-*side* end, the second end portion 82 located at the end opposite to the second valve body portion 33 (end closer to the first base end portion 23 of the outer valve body 20), and the idle portion 84 located between the first end portion 80 and the second end portion 82. The outer surface 62 of the second tubular portion 32 in the middle portion 84 is recessed inward in the radial direction of the second tubular portion 32 over the entire periphery of the second tubular portion 32. The distance W84 between the outer surface 62 of the second tubular portion 32 in the middle portion 84 and the inner surface 52 of the first tubular portion 22 is greater than the distance W80 between the outer surface 62 of the second tubular portion 32 in the first end portion 80 and the inner surface 52 of the first tubular portion 22. Further, the distance W84 between the outer surface 62 of the second tubular portion 32 in the middle portion 84 and the inner surface 52 of the first tubular portion 22 is greater than the distance W82 between the outer surface 62 of the second tubular portion 32 in the second end portion 82 and the inner surface 52 of the first tubular portion 22.

According to this configuration, the outer surface 62 of the second tubular portion 32 of the inner valve body 30 in the middle portion 84 is recessed inward, and this suppresses the liquid from remaining between the outer surface 62 of the second tubular portion 32 in the middle portion 84 and the inner surface 52 of the first tubular portion 22. Further, although the distance between the outer surface 62 of the second tubular portion 32 in the middle portion 84 and the inner surface 52 of the first tubular portion 22 is greater, the posture of the second tubular portion 32 can be stabilized within the first tubular portion 22 by the presence of the first ed portion 80 and the second end portion 82 of the second tubular portion 32. Thus, the configuration above can stabilize the posture of the inner valve body 30, while suppressing the liquid from remaining between the inner surface 52 of the outer valve body 20 and the outer surface 62 of the inner valve body 30.

(Variants) (1) The outer diameter of the second tubular portion 32 of the inner valve body 30 in the first end portion 80 may be smaller than the outer diameter of the second tubular portion 32 in the second end portion 82. That is, the distance W80 between the outer surface 62 of the second tubular portion 32 in the first end portion 80 and the inner surface 52 of the first tubular portion 22 may be greater than the distance W82 between the outer surface 62 of the second tubular portion 32 in the second end portion 82 and the inner surface 52 of the first tubular portion 22. This configuration suppresses the liquid from remaining between the outer surface 62 of the second tubular portion 32 in the first end portion 80 and the inner surface 52 of the first tubular portion 22.

(2) In the embodiment described above, the outer surface 62 of the second tubular portion 32 in the middle portion 84 is curved, but this need not be the case. In a variant, the outer surface 62 of the second tubular portion 32 in the middle portion 84 may be bent.

Figure 7:
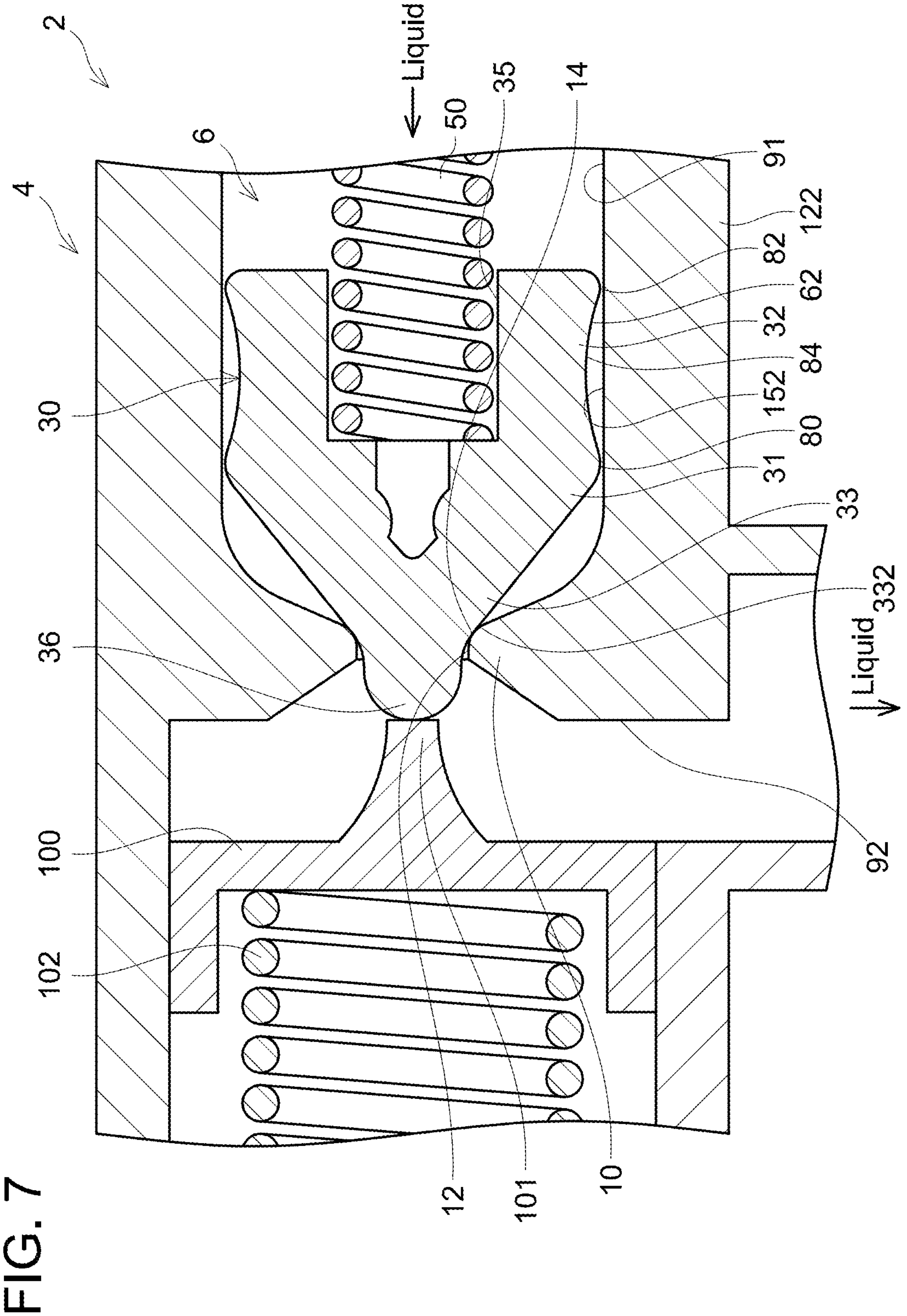
FIG. 7 is a cross-sectional view of a pressure reduction valve according to a variant.

(3) In the embodiment described above, the valve body 6 comprises the outer valve body 20, but this need not be the case. In a variant, the valve body 6 may not comprise the outer valve body 20. In this case, as shown in FIG. 7, the inner valve body 30 is disposed in the first flow path 91 of the body 4. The inner valve body 30 is arranged to face the first opening 12 and the first seat surface 14 of the first valve seat portion 10 of the body 4. The first opening 12 is opened and closed by the second valve body portion 33 of the inner valve body 30 separating from and contacting the first seat surface 14.

The outer surface 62 of the second tubular portion 32 of the inner valve body 30 faces an inner surface 152 of the body tubular portion 122 (another example of outer tubular portion) of the body 4 (another example of outer member) in the radial direction of the second tubular portion 32. The distance between the outer surface 62 of the second tubular portion 32 of the inner valve body 30 in the middle portion 84 and the inner surface 152 of the body tubular portion 122 of the body 4 is greater than the distance between the outer surface 62 of the second tubular portion 32 in the first end portion 80 and the inner surface 152 of the body tubular portion 122. Further, the distance between the outer surface 62 of the second tubular portion 32 in the middle portion 84 and the inner surface 152 of the body tubular portion 122 of the body 4 is greater than the distance between the outer surface 62 of the second tubular portion 32 in the second end portion 82 and the inner surface 152 of the body tubular portion 122.

(4) In the embodiment described above, the pressure reduction valve 2 for reducing liquid pressure is described, but this need not be the case. In a variant, the pressure reduction valve 2 may be a valve for reducing the pressure of a gas (e.g., hydrogen gas or the like). In this case as well, the pressure reduction valve 2 can suppress a liquid (e.g., water, etc.) contained in the gas from remining between the inner surface 52 of the outer valve body 20 and the outer surface 62 of the inner valve body 30.

(Experiment) A comparison test between an exemplary pressure reduction valve and a comparative-example pressure reduction valve is described. The exemplary pressure reduction valve was the pressure reduction valve 2 according to the embodiment described above. The comparative-example pressure reduction valve had a configuration in which the outer surface 62 of the second tubular portion 32 of the inner valve body 30 in the middle portion 84 is not recessed, compared to the pressure reduction valve 2 according to the embodiment. For the exemplary and comparative-example pressure reduction valves, volumes of liquid remaining in the clearance 60 between the outer surface 62 of the second tubular portion 32 of the inner valve body 30 in the middle portion 84 and the inner surface 52 of the first tubular portion 22 of the outer valve body 20 were compared in simulation.

Figure 8:
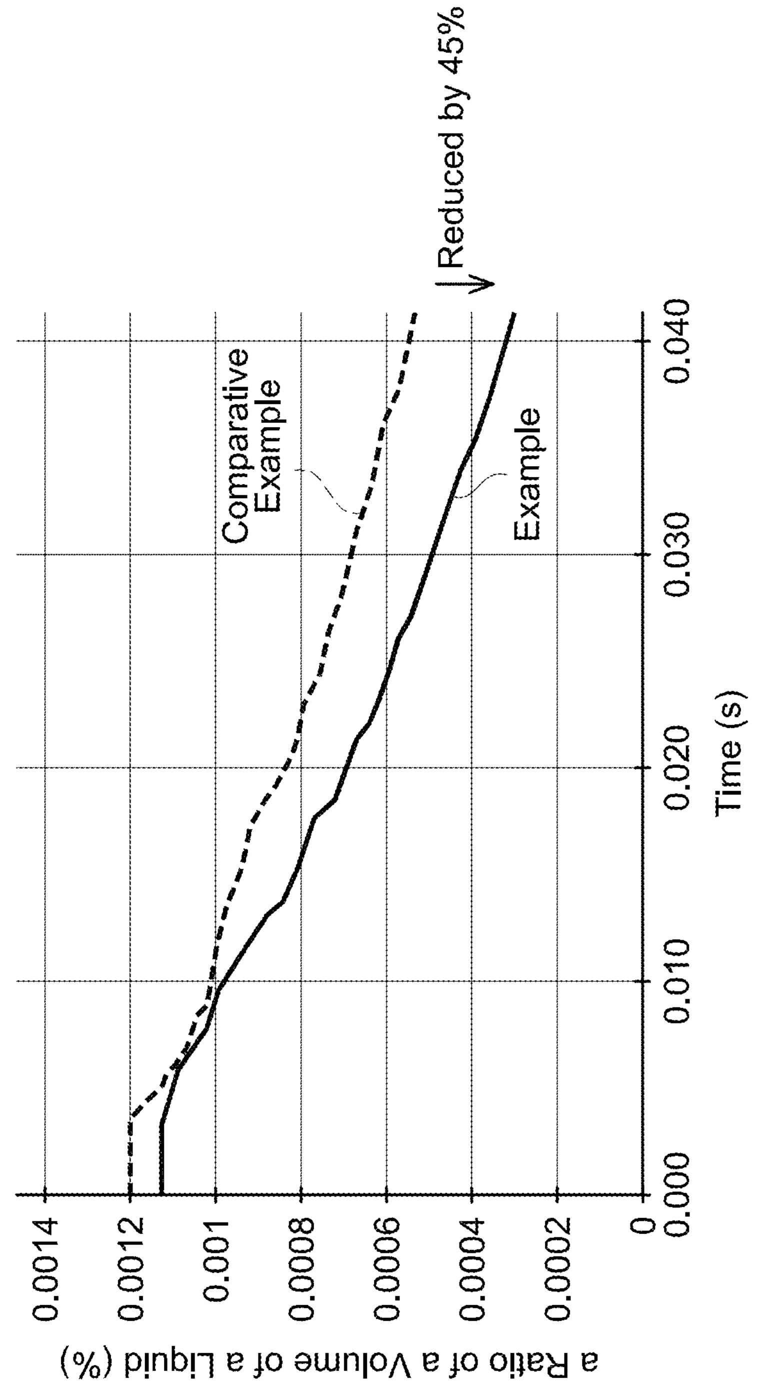
FIG. 8 is a diagram showing an experiment result.

The graph in FIG. 8 shows the result of the comparison test. The horizontal axis of the graph shown in FIG. 8 represents time for which the liquid flowed in the clearance 60. The vertical axis of the graph represents a ratio of a volume of the liquid remaining in the clearance 60 facing the outer surface 62 of the second tubular portion 32 in the middle portion 84 to the volume of the first flow path 91 and the third flow path 93. As shown in FIG. 8, it has been confirmed that in the exemplary pressure reduction valve (the pressure reduction valve 2 according to the embodiment), the volume of the liquid remaining in the clearance 60 facing the outer surface 62 of the second tubular portion 32 in the middle portion 84 was reduced by about 45% compared to the comparative-example pressure reduction valve. As above, it has been confirmed that the exemplary pressure reduction valve (the pressure reduction valve 2 according to the embodiment) can suppress the liquid from remaining between the inner surface 52 of the outer valve body 20 and the outer surface 62 of the inner valve body 30.

While specific examples of the present disclosure have been described above in detail, these examples are merely illustrative and place no limitation on the scope of the patent claims. The technology described in the patent claims also encompasses various changes and modifications to the specific examples described above. The technical elements explained in the present description or drawings provide technical utility either independently or through various combinations. The present disclosure is not limited to the combinations described at the time the claims are filed. Further, the purpose of the examples illustrated by the present description or drawings is to satisfy multiple objectives simultaneously, and satisfying any one of those objectives gives technical utility to the present disclosure.

REFERENCE SIGNS LIST

2: pressure reduction valve, 4: body, 6: valve body, 10: valve seat, 12: first opening, 14: outer valve seat portion, 20: outer valve body, 21: first tip end portion, 22: first tubular portion, 23: first base end portion, 24: second opening, 25: third opening, 26: outer valve body portion, 27: inner valve seat portion, 30: inner valve body, 31: second tip end portion, 32: second tubular portion, 33: inner valve body portion, 35: spring chamber, 36: projection, 50: small coil spring, 52: inner surface, 60: clearance, 62: outer surface, 80: first end portion, 82: second end portion, 84: middle portion, 91: first flow path, 92: second flow path, 93: third flow path, 100: piston, 101: projection, 102: large coil spring, 122: tubular portion, 152: inner surface

The invention claimed is:

1. A pressure reduction valve comprising an outer member and an inner member disposed inside the outer member, wherein the outer member comprises a valve seat portion having an opening which allows a fluid to flow therethrough, and an outer tubular portion extending tubularly from the valve seat portion, the inner member comprises a valve body portion which opens and closes the opening, and an inner tubular portion extending tubularly from the valve body portion and disposed inside the outer tubular portion, the inner tubular portion comprises a first end portion located at a valve body-side end, a second end portion located at an end opposite to the valve body portion, and a middle portion located between the first end portion and the second end portion, an outer surface of the inner tubular portion in the middle portion is recessed inward in a radial direction of the inner tubular portion over an entire periphery of the inner tubular portion, and a distance between the outer surface of the inner tubular portion in the middle portion and an inner surface of the outer tubular portion is greater than a minimum distance between the outer surface of the inner tubular portion in the first end portion and the inner surface of the outer tubular portion and greater than a minimum distance between the outer surface of the inner tubular portion in the second end portion and the inner surface of the outer tubular portion; and wherein:

the minimum distance between the outer surface of the inner tubular portion in the first end portion and the inner surface of the outer tubular portion is greater than the minimum distance between the outer surface of the inner tubular portion in the second end portion and the inner surface of the outer tubular portion.

* * * * *